United States Patent [19]

Archer, Jr. et al.

[11] 4,023,042
[45] May 10, 1977

[54] ANTI-THEFT DEVICE

[76] Inventors: Herbert B. Archer, Jr., Box 128, Steamburg, N.Y. 14783; Ronald J. Kucinski, 4 Washington St., Silver Creek, N.Y. 14136

[22] Filed: Mar. 25, 1976

[21] Appl. No.: 670,259

[52] U.S. Cl. .............................. 307/10 AT; 340/64; 180/114
[51] Int. Cl.² .......................................... H02G 3/00
[58] Field of Search .................... 307/10 AT, 10 R; 340/63, 64; 180/114

[56] References Cited
UNITED STATES PATENTS

| | | | |
|---|---|---|---|
| 3,603,750 | 9/1971 | Beier | 307/10 AT |
| 3,623,569 | 11/1971 | Wilkins | 307/10 AT |
| 3,639,772 | 2/1972 | Wilson | 307/10 AT |

*Primary Examiner*—Herman J. Hohauser
*Attorney, Agent, or Firm*—Sommer & Sommer

[57] ABSTRACT

An automotive anti-theft device is operatively arranged to interrupt a vehicle's starter circuit until the key-operated ignition selector switch has been physically rotated to the "start" position. The anti-theft device includes a mechanical device adapted to convert rotational movement of the selector switch into linear motion, a hydraulic piston arranged to convert such linear motion into a flow of hydraulic fluid, and a pressure responsive device mounted on the vehicle's starter. The pressure responsive device has a movable member operatively arranged to move in response to such flow of hydraulic fluid, and is adapted to complete the starter circuit between two terminals thereof only when the selector switch has been rotated to the "start" position.

9 Claims, 9 Drawing Figures

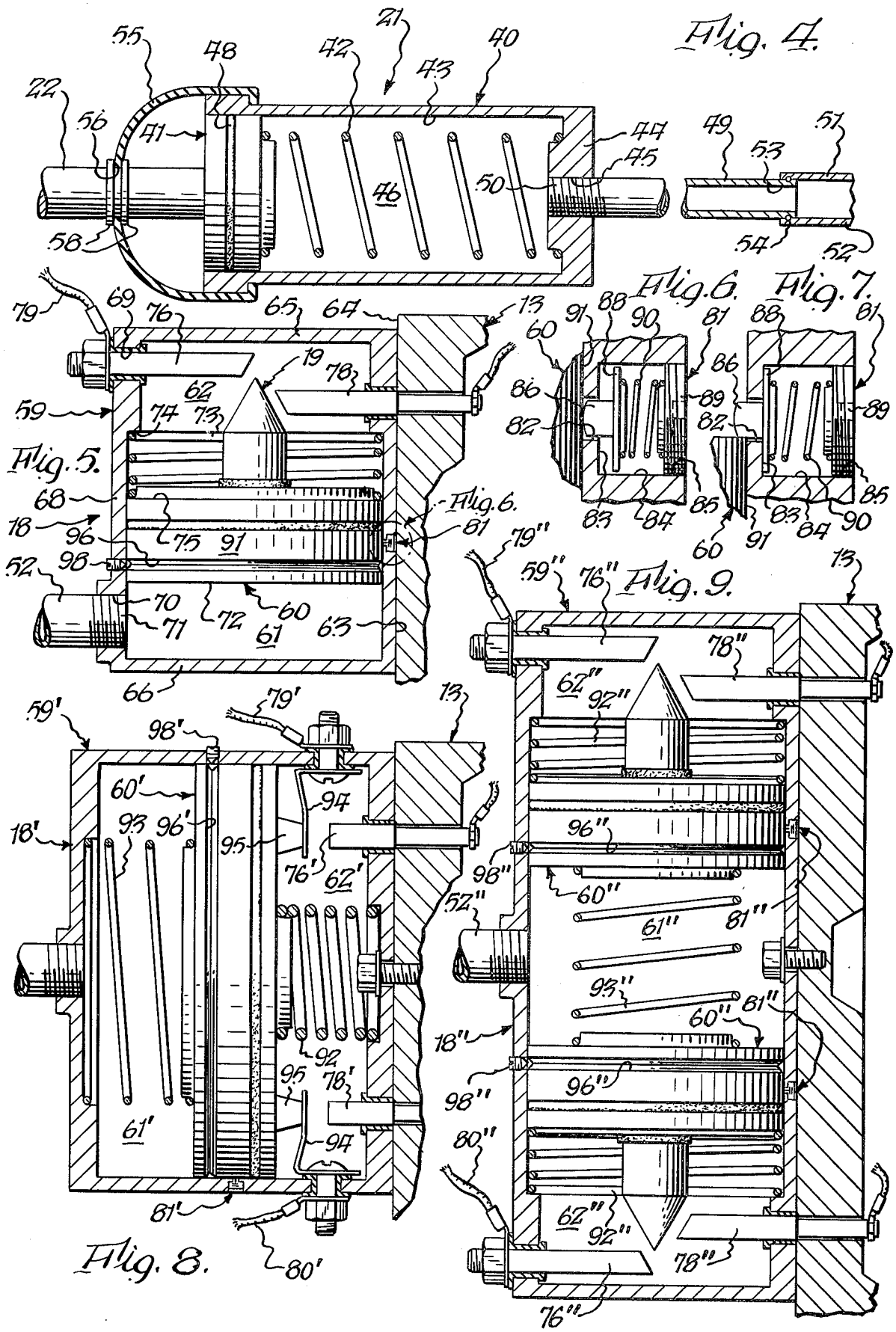

ANTI-THEFT DEVICE

BACKGROUND OF THE INVENTION

1. Field of the Invention

The present invention relates generally to a device for deterring theft of a motor vehicle, and more particularly to an improved anti-theft device which is adapted to prevent a thief from "hot wiring" the ignition switch to quickly start the vehicle's motor.

2. Description of the Prior Art

Today, many automobiles are provided with an ignition selector switch which is adapted to be moved between "accessory", "off", "on", and "start" positions to close different electrical circuits of the vehicle. Normally, such a selector switch includes a key-operated rotatable locking section and an electrical section arranged to rotate with the locking section. Upon information and belief, it has heretofore been possible for a thief to disable or remove the locking section to gain access to the switch's electrical section. Thereafter, the thief could easily close the starter circuit with a short piece of wire to "hot wire" the switch and quickly start the vehicle's engine. However, it is believed that the frequency of such thefts is directly related to the ease and speed with which the vehicle can be hot wired.

Others have devised anti-theft devices to deter such theft. Such other devices are typically shown in the U.S. Pat. Nos. 3,174,502; 1,966,621; 3,160,761; 3,579,285; and 3,651,329.

SUMMARY OF THE INVENTION

The present invention provides an improved anti-theft device which is adapted to be associated with a motor-driven vehicle having a rotatable selector switch and having an electrical starter circuit including the selector switch and including a starter, and wherein the starter circuit is arranged to normally energize the starter when the selector switch has been rotated to a predetermined position, normally the start position, at which the selector switch may close the starter circuit.

The anti-theft device is arranged to normally interrupt the starter circuit to prevent the starter from being energized, and is operable to complete the starter circuit only when the selector switch has been physically rotated to the predetermined position.

The anti-theft device includes pressure means operatively arranged to convert rotational movement of the selector switch toward the predetermined position into a flow of hydraulic fluid; pressure responsive means arranged to interrupt the starter circuit and operatively arranged to receive such flow of hydraulic fluid, the pressure responsive means having two spaced terminals operatively arranged in the starter circuit and having a movable member biased to move away from these terminals but operable to move toward these terminals in response to a flow of hydraulic fluid; and contact means mounted on the movable member and arranged to complete the starter circuit between the terminals only when the selector switch has been rotated to the predetermined position; whereby the starter may not be energized unless the selector switch has been rotated to the predetermined position.

The pressure means may include motion transfer means operatively arranged to convert rotational movement of the selector switch into linear movement, and hydraulic piston means operatively arranged to convert such linear movement of the motion transfer means into a flow of pressurized hydraulic fluid. In one form, the motion transfer means may include a rod mounted for linear movement, and an arm having one marginal end portion mounted on the rod and having its other marginal end portion mounted on the selector switch at an eccentric position whereby, when the selector switch is rotated, the arm may cause the rod to move. In another form, the motion transfer means may include a cam surface mounted on the selector switch and for rotation therewith, and a rod mounted for linear movement and having one end portion engaging the cam surface whereby, when the selector switch is rotated toward said predetermined position, the cam surface may cause the rod to move. In either of these two embodiments of the motion transfer means, the rod may be arranged to rotate in only one direction.

The pressure responsive means may include a cylinder, and the movable member may be a piston slidably mounted in the cylinder and separating a wet chamber of the cylinder from a dry chamber thereof. In this embodiment, the terminals are arranged in the dry chamber. Alternatively, a diaphragm may be substituted for the piston in the pressure responsive means. In the preferred embodiment, the pressure responsive means is mounted on the vehicle's starter.

The pressure responsive means may further include catch means operatively arranged to prevent the piston or diaphragm from moving toward the terminals if the pressure of hydraulic fluid in the wet chamber falls below a predetermined minimum pressure. The catch means may include a plunger mounted on the cylinder and biased to normally engage the peripheral surface of the piston, such that the plunger is arranged to move into the dry chamber when the piston is moved to uncover the plunger.

Accordingly, one general object of the invention is to provide an anti-theft device which is adapted to deter quick theft of a vehicle.

Another object is to provide an improved anti-theft device which requires that the selector switch be physically rotated to the start position as a condition precedent to energization of the vehicle's starter.

Another object is to provide an improved anti-theft device which is adapted to render a vehicle's starter circuit inoperative if a selector switch is tampered with or removed.

Still another object is to provide an improved anti-theft device which is relatively uncomplicated, which is relatively inexpensive to manufacture, and which results in a more facile combination of structure than that heretofore known in the prior art.

These and other objects and advantages will become apparent from the foregoing and ongoing written specification, the drawings, and the appended claims.

BRIEF DESCRIPTION OF THE DRAWINGS

FIG. 4 is an enlarged fragmentary vertical sectional view thereof, taken generally on line 4—4 of FIG. 1, this view showing the hydraulic piston means. 1

FIG. 5 is an enlarged fragmentary vertical sectional view of the pressure responsive means shown in FIG. 1.

FIG. 6 is a further enlarged fragmentary vertical sectional view of the structure within the indicated box in FIG. 5, this view showing the catch means normally engaging the peripheral surface of the piston.

FIG. 7 is a view, generally similar to FIG. 6, but showing the biased plunger as having entered the dry chamber after the piston has moved downwardly to uncover the catch means.

FIG. 8 is a fragmentary vertical sectional view of second embodiment of the pressure responsive means.

FIG. 9 is a fragmentary vertical sectional view of a third embodiment of the pressure responsive means.

DESCRIPTION OF THE PREFERRED EMBODIMENT

Figure 1:
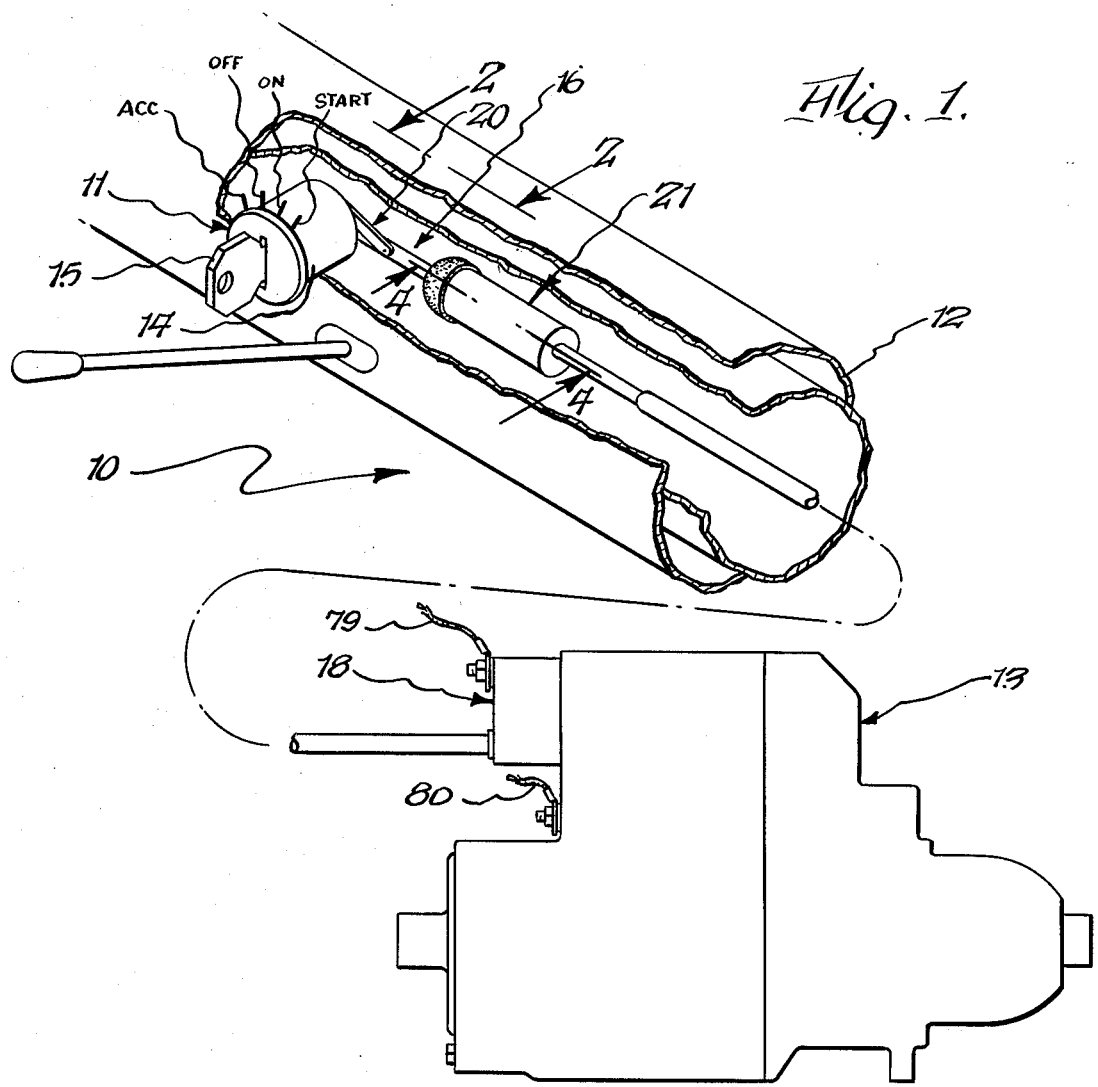
FIG. 1 is a perspective schematic view of the inventive anti-theft device operatively associated with the starter circuit of an automobile, this view showing the selector switch and the pressure means mounted on the vehicle's steering column, and showing the pressure responsive means mounted on the vehicle's starter.

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring now to the several drawing figures and more particularly to FIG. 1 thereof, the present invention broadly provides an improved anti-theft device, of which the presently preferred embodiment is generally indicated at 10, which is adapted to be used in association with a motor-driven vehicle, such as an automobile (not fully shown). In FIG. 1, such an automobile is depicted fragmentarily as including a rotatable selector switch, generally indicated at 11, mounted on a steering column 12; a starter, generally indicated at 13; and an electrical starter circuit (not fully shown) which includes the selector switch 11 and the starter 13, and which is operatively arranged to energize the starter from a suitable source of electrical energy, such as the vehicle's battery, when the selector switch has been rotated to a predetermined position.

Figure 2:
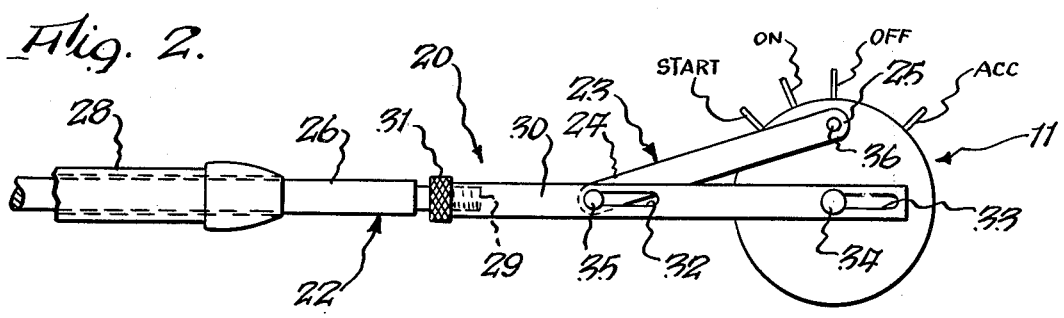
FIG. 2 is an enlarged fragmentary vertical sectional view thereof, taken generally on line 2—2 of FIG. 1, this view showing one form of the motion transfer means.
Figure 3:
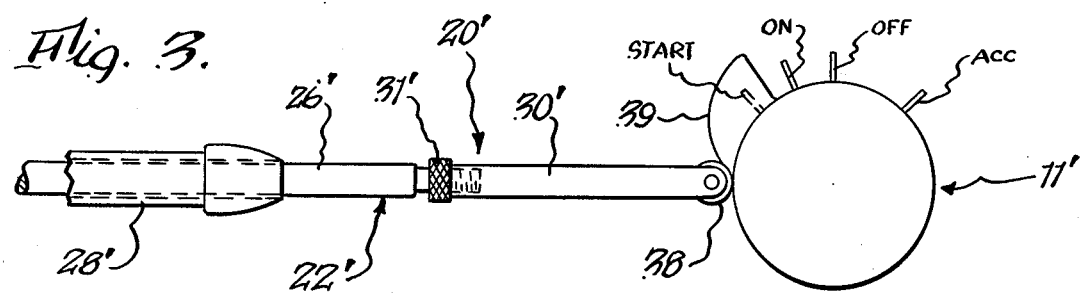
FIG. 3 is a view, generally similar to the view of FIG. 2, showing another form of the motion transfer means.

The selector switch 11 is schematically shown as being of conventional design, and broadly includes a key-operated locking section having a tumbler (not shown) rotatably mounted within a stationary housing 14, and includes an electrical section having an armature (not shown) arranged to rotate with the tumbler to any of four angular positions, these being indicated as the accessory (abbreviated to acc), off, on, and start positions in FIGS. 1–3. When the selector switch 11 is in the off position, a key 15 may be inserted into the locking section, after which the tumbler and armature may be selectively rotated in either a counterclockwise direction to the accessory position, or in a clockwise direction to the on or start positions. Of course, different electrical circuits are closed when the selector switch is in each of these different positions.

In the conventional manner, when selector switch 11 is moved to the start position, the electrical section closes the starter circuit to cause the starter solenoid (not shown) to create an operative meshing engagement between the electrical starter motor and the vehicle's main engine, and to energize the engaged starter motor to crank the vehicle's engine until ignition occurs and the engine begins to run independently. As soon as the engine catches, the selector switch is returned to the on position to deenergize the starter circuit.

Heretofore, upon information and belief, it has been possible for a thief to quickly disable or remove the selector switch's locking section to gain access to its electrical section. Thereafter, the thief could hot wire the electrical section to close the starter circuit and start the vehicle.

The inventive anti-theft device 10 operates to deter such theft by requiring that the selector switch 11 be physically rotated to the start position as a condition precedent to the operation of the starter circuit, and operates to disable the starter circuit if the selector switch 11 is tampered with or removed. To this end, the anti-theft device 10 is arranged to normally interrupt the starter circuit between two terminals thereof to prevent the starter from being energized, and is operable to complete the starter circuit between these terminals only after the selector switch has been physically rotated to the start position.

Adverting now to FIGS. 1–5, the anti-theft device 10 is shown as broadly including pressure means, generally indicated at 16, operatively arranged to convert rotational movement of the selector switch into a flow of hydraulic fluid; pressure responsive means, generally indicated at 18, arranged to receive such flow of hydraulic fluid and having a movable member, such as a piston, operatively arranged to move in response to such flow; and contact means, generally indicated at 19 (FIG. 5), mounted on the movable member and arranged to complete the starter circuit between the two terminals only when the selector switch has been rotated to the start position.

In FIG. 1, the pressure means 16 is shown as including motion transfer means, generally indicated at 20, operatively arranged to convert rotational movement of the selector switch 11 into linear movement; and hydraulic piston means, generally indicated at 21, operatively arranged to convert such linear movement into a flow of hydraulic fluid.

Referring now to FIG. 2, the motion transfer means 20 is shown as including a push rod, generally indicated at 22, mounted for linear movement; and an arm, generally indicated at 23, having one marginal end portion 24 mounted on the push rod and having its other marginal end portion 25 mounted on the selector switch 11 at an eccentric location such that, when the selector switch is rotated, the arm will cause the push rod to move. Push rod 22 is shown as including a horizontally-elongated left portion 26 slidably mounted in a guide tube 28 for linear movement therealong, and having a threaded stud 29 extending rightwardly from its vertical right end face, and a right portion 30 having a freely-rotatable thumb wheel 31 mounted on its left end to matingly engage this threaded stud 29. Thus, thumb wheel 31 may be suitably rotated to adjust or vary the operative length of push rod 22. The rod right portion 30 is shown provided with horizontally-elongated slots 32, 33 at an intermediate portion of its length and adjacent its right marginal end portion, respectively. A pin 34, mounted axially on the selector switch, is shown as being operatively arranged in right slot 33 to further guide such linear movement of rod 22. Adjacent its lower marginal end portion 24, the arm is provided with a pin 35 arranged in rod intermediate slot 32. The upper marginal end portion 25 of this arm is pivotally mounted on a pin 36 extending outwardly from the selector switch at an eccentric location. Thus, when the selector switch is rotated toward the start position from the off position depicted in FIG. 2, the arm will cause the push rod to move linearly (leftwardly in the view of FIG. 2) into the guide tube 28. However, if the selector switch is rotated from the off position toward the accessary position, the arm pin 35 will slide in elongated slot 32 to prevent such rotational movement of the selector switch from pulling the rod out of the guide tube, for a purpose hereinafter apparent.

In FIG. 3, an alternative embodiment of the motion transfer means is generally indicated at 20'. This alternative embodiment is shown as having a left portion 26', identical to left rod portion 26, connected to a right portion 30' through an intermediate thumb wheel 31'. However, in this alternative embodiment a freely-rotatable follower wheel 38 is mounted on the right marginal end portion of right rod portion 30' to engage a cam surface 39 mounted on the selector switch and arranged to rotate therewith. Thus, if the selector switch 11 is rotated toward the start position from the off position depicted in FIG. 3, the cam surface 39 will displace the push rod 22' leftwardly. On the other hand, it will be appreciated that the selector switch may be rotated from the off position toward the accessory position without pulling the rod out of the guide tube. Therefore, both the first and second embodiments 20, 20' of the motion transfer means are arranged to impart linear motion to the push rod in only one direction.

Referring now to FIG. 4, the hydraulic piston means 21 is shown as including a stationary cylinder, generally indicated at 40, in which a piston, generally indicated at 41, is mounted for sealed sliding movement against the bias of a coil spring 42. The cylinder 40 is shown as having an open left end, an inner cylindrical surface 43, and a right end 44 provided with a tapped through hole 45. A hydraulic chamber 46 is bounded by the right vertical face of the piston 41, the cylindrical surface 43, and the cylinder right end 44. Hydraulic fluid within chamber 46 is prevented from leaking past piston 41 by an O-Ring 48. The push rod 22 of the motion transfer means is suitably connected to piston 41 such that linear motion of the push rod will displace the piston 41 rightwardly against the urging of spring 42, to force hydraulic fluid in chamber 46 through hole 45. To this end, a tubular conduit 49 has its threaded left marginal end portion 50 matingly received in tapped hole 45. In FIG. 4, the left marginal end portion 51 of another conduit 52 of larger diameter is shown as telescopically receiving the right marginal end portion 53 of the first conduit 49. In this manner, these overlapped marginal end portions 51, 53, which are sealed by an intermediate O-ring 54, provide a slip joint in the composite fluid-carrying conduit. Finally, a flexible domed dust cover 55, preferably formed of rubber or the like, is shown as being mounted on the cylinder 40 to seal the open left end thereof. This dust cover 55 is provided with a central through hole 56 which is penetrated by push rod 22, it being appreciated that a marginal portion of the dust cover about hole 56 is received between two annular bosses 58, 58 mounted on the push rod. Therefore, the hydraulic piston means 21 is operatively arranged to convert linear movement of the push rod 22 into a flow of hydraulic fluid, and to deliver such flow through series connected conduits 49, 52 for a purpose hereinafter apparent.

Referring now to FIGS. 1 and 5, the pressure responsive means 18 is shown as being mounted on the starter 13. The pressure responsive means 18 is arranged to interrupt the starter circuit, and is operatively arranged to receive the flow of hydraulic fluid from the pressure means 16. As best shown in FIG. 5, the pressure responsive means 18 includes stationary cylinder, generally indicated at 59, mounted on the starter 13, and a movable member, such as piston 60, slidably mounted in cylinder 59 and separating a lower wet chamber 61 thereof from an upper dry chamber 62 thereof. The cylinder 59 has a rightward surface 63 arranged to abut the vertical left surface 64 of the starter, a horizontal upper end 65, a horizontal lower end 66, and a leftward vertical outer wall 68 penetrated by an upper through hole 69 communicating with the dry chamber 62, and penetrated by a lower tapped hole 70 communicating with the wet chamber 61. The right marginal end portion 71 of tubular conduit 52 is shown as being threaded into tapped hole 70 such that hydraulic fluid flowing from the hydraulic piston means through conduits 49, 52 will be supplied to the wet chamber 61 to act on the horizontal lower face 72 of piston 60. Of course, such hydraulic fluid, normally oil or some other petroleum-based liquid, is incompressible and may flow under different pressures depending upon the forces resisting such flow. Persons skilled in this art will readily appreciate the pressure of such hydraulic fluid, acting over the area of piston lower face 72, will exert an upward force on the piston 60 to oppose a downward force exerted by coil spring 73 operatively arranged in the dry chamber 62 to act between a downwardly-facing annular shoulder 74 of cylinder 59 and the upper face 75 of the piston.

In FIG. 5, a left terminal 76 is shown as penetrating hole 69 to be arranged in dry chamber 62, and a right terminal 78 is shown as penetrating aligned holes provided through the cylinder and starter housing assembly, respectively. The left and right terminals 76, 78 spaced from one another in dry chamber 62 and are operatively arranged in the starter circuit. Thus, the left terminal 76 is electrically connected to the selector switch by an insulated conductor 79, and the right terminal 78 is electrically connected to the starter. In this manner, the two spaced terminals are operatively arranged to interrupt the starter circuit between the selector switch 11 and the starter. In FIG. 1, conductor 80 is depicted as electrically connecting the selector switch 11 directly with the starter 13. The piston 60 is biased by spring 73 to move downwardly away from terminals 76, 78, but is operable to move upwardly toward these terminals in response to a flow of hydraulic fluid into wet chamber 61 as the selector switch 11 is rotated toward the start position.

The pressure responsive means 18 may further include catch means, generally indicated at 81, operatively arranged to prevent the piston 60 from moving toward terminals 76, 78 if the pressure of hydraulic fluid in wet chamber 61 falls below a predetermined minimum pressure. As best shown in FIG. 6, the catch means 81 is arranged to be mounted in a specially configured hole provided through the cylinder 59, which hole includes (from left to right in FIG. 6) a leftward cylindrical surface portion 82, a rightwardly-facing annular vertical shoulder 83, a cylindrical surface portion 84, and a rightward threaded portion 85. The catch means 81 may include a plunger member 86 mounted for sliding movement along surface portion 82 and having a vertical disc portion 88 at its right end, a rightward end cap 89 arranged to matingly engage threaded portion 85, and a compression spring 90 arranged to act between the plunger disc 88 and the end cap 89 to urge the nose of the plunger member 86 to move leftwardly. During normal movement of piston 60, the nose of plunger member 86 rides on the cylindrical peripheral surface 91 of piston 60. However, if the pressure of hydraulic fluid in wet chamber 61 falls below a predetermined minimum value, spring 73 will cause the piston 60 to move downwardly to uncover the catch means 81 and to allow the biased plunger 86 to snap out into the dry chamber 62, this being shown in FIG. 7.

In FIG. 5, the contact means 19 is shown as simply being an electrically conductive metallic member which is arranged to engage each of terminals 76, 78 when the piston 69 has been moved upwardly.

Thus, when the selector switch is in the off position, the starter circuit is opened at the electrical section of selector switch 11, and between terminals 76, 78. If the selector switch is then rotated toward the start position, hydraulic fluid will flow from the hydraulic piston means 21 to enter the wet chamber 61 of the pressure responsive means. Such flow will cause the pressure in wet chamber 61 to increase until the upward force exerted on piston 60 exceeds the downward force exerted by spring 73. When this force imbalance occurs, the piston moves upwardly toward terminals 76, 78. Finally, when the selector switch has been rotated to the start position, the electrical section of selector switch 11 will close switch contacts of the starter circuit, and the contact means 19 will contact terminals 76, 78 to complete the starter circuit. After the vehicle's engine has started, selector switch 11 may be again returned to the on position to open the starter circuit at the electrical section of the starter switch, and between terminals 76, 78.

The anti-theft device 10 is designed such that if a thief tampers with or removes the selector switch 11, the pressure of hydraulic fluid in wet chamber 61 will fall below a predetermined minimum value, thereby allowing spring 73 to move piston 60 downwardly to uncover the catch means 81 and allow the biased plunger 86 to snap into dry chamber 62, as shown in FIG. 7. In this position, the plunger 86 will prevent the piston 60 from moving upwardly to complete the starter circuit between terminals 76, 78. Thus, once plunger 86 has snapped into dry chamber 62, piston 60 cannot be thereafter moved to engage the terminals 76, 78 without first resetting the catch means 81, which requires removal and disassembly of the pressure responsive means 18 from the starter. Therefore, the hydraulic connection between the selector switch and the starter circuit effectively requires that the selector switch be physically rotated to the start position to close the starter circuit between terminals 76, 78. If a thief attempts to tamper with or remove the selector switch, and causes the pressure of the hydraulic fluid to fall below a predetermined minimum pressure such that plunger 86 snaps into dry chamber 62, the starter circuit will remain open between terminals 76, 78 to prevent the starter from being energized even if the thief is able to hot wire the electrical section of the selector switch. While the disabled starter circuit can be restored to its normal operation by disassembly and repair of the pressure responsive means 18, it is felt that the length of time required to effect such repairs would provide a sufficient deterrent to quick theft of the vehicle.

A second embodiment of the pressure responsive means is generally indicated at 18' in FIG. 8, in which the same numeral primed indicates the correspondingly identified structure previously described. This second embodiment is shown as having a piston 60' mounted for sliding movement in a cylinder 59' and separating a dry chamber 62' thereof from a wet chamber 61' thereof. However, in this embodiment, a first spring 92 is arranged in the dry chamber 62' to act between the piston and cylinder, and a second spring 93 is arranged in the wet chamber 61 to act between the piston and cylinder. When the pressure of hydraulic fluid in wet chamber 61' falls below a minimum pressure, the net force exerted on the piston 60' by springs 92, 93 will cause the piston 60' to move leftwardly to uncover the catch means 81' and allow its biased plunger to snap into dry chamber 62'. However, in this embodiment, starter circuit wires 79', 80' are mounted on the pressure responsive means 18' and are electrically connected to L-shaped spring clips 94, 94 mounted on the cylinder within dry chamber 62'. As the pressure in wet chamber 61' increases to move the piston rightwardly toward starter circuit terminals 76', 78', raised bosses 95, 95 mounted on piston 60' engage the inwardly-projecting legs of clips 94, 94 and displace them to engage circuit terminals 76', 78' when the selector switch has been fully rotated to the start position.

A third embodiment of the pressure responsive means is shown in FIG. 9, in which the same element double primed indicates the correspondingly identified element previously described. However, in this embodiment 18'', two pistons 60'', 60'' are slidably mounted in cylinder 59''. Each of these pistons 60'', 60'' is shown as separating a dry chamber 62'' from a common wet chamber 61''. Moreover, a first spring 92'' is arranged in each dry chamber 62'', to act between the cylinder and each piston, and a second spring 93'' is arranged in the wet chamber 61'' to act between the two pistons. Thus, hydraulic fluid supplied to wet chamber 61'' will move the upper piston 60'' toward one set of starter circuit terminals 76'', 78'', and will move lower piston 60'' toward a second set of starter circuit terminals 76'', 78''.

Therefore, each of the three embodiments 18, 18' and 18'' of the pressure responsive means is arranged to interrupt the starter circuit and is operatively arranged to receive a flow of hydraulic fluid. Each of these embodiments 18, 18' and 18'' has at least two spaced terminals operatively arranged in the starter circuit, and has at least one movable member biased to move away from these terminals but operable to move toward these terminals in response to a flow of hydraulic fluid as the selector switch is rotated toward the "start" position.

In this manner, the inventive anti-theft device is arranged to normally interrupt the starter circuit to prevent the starter from being energized, and is selectively operable to complete the starter circuit only when the selector switch has been rotated to the predetermined start position.

Of course persons skilled in this art will readily appreciate that the terminals 76, 78 are suitably insulated as they penetrate the cylinder so as to be operatively arranged in the starter circuit. Moreover, in each of the three embodiments of the pressure responsive means 18, 18', 18'', the piston may be provided with an annular groove 96, 96', 96'', respectively, and a set screw 98, 98', 98'', respectively, may be threaded through the cylinder. These set screws may be suitably rotated to engage the piston grooves to hold the piston immovable during assembly and repair of the pressure responsive means to reset the catch means.

While the presently preferred embodiments of anti-theft device 10 have been shown and described in association with an automobile, the present invention contemplates that the inventive device 10 could be used with other types of motor-driven vehicles, such as boats, aircraft, trucks, busses, and the like.

Therefore, while the presently preferred embodiments of the inventive anti-theft device have been shown and described, persons skilled in this art will readily appreciate that various other modifications and changes may be made without departing from the true spirit of the invention, which is generically defined by the following claims.

What is claimed is:

1. In a motor-driven vehicle having a rotatable selector switch and having an electrical starter circuit including said selector switch and including a starter, and wherein said starter circuit is arranged to normally energize said starter when said selector switch has been rotated to a predetermined position at which said selector switch may close said starter circuit, the improvement which comprises:

an anti-theft device arranged to normally interrupt said starter circuit to prevent said starter from being energized, and operable to complete said starter circuit only when said selector switch has been rotated to said predetermined position, said device including pressure means operatively arranged to convert rotational movement of said selector switch toward said predetermined position into a flow of hydraulic fluid;

pressure responsive means arranged to interrupt said starter circuit and operatively arranged to receive such flow of hydraulic fluid, said pressure responsive means having two spaced terminals operatively arranged in said starter circuit and having a movable member biased to move away from said terminals but operable to move toward said terminals in response to said flow of hydraulic fluid; and contact means mounted on said movable member and arranged to complete said starter circuit between said terminals only when said selector switch has been rotated to said predetermined position;

whereby said starter may not be energized unless said selector switch has been rotated to said predetermined position.

2. The improvement as set forth in claim 1 wherein said pressure means includes motion transfer means operatively arranged to convert rotational movement of said selector switch into linear movement, and hydraulic piston means operatively arranged to convert such linear movement of said motion transfer means into a flow of hydraulic fluid.

3. The improvement as set forth in claim 2 wherein said motion transfer means includes a rod mounted for linear movement, and an arm having one marginal end portion mounted on said rod and having its other marginal end portion mounted on said selector switch at an eccentric location whereby, when said selector switch is rotated toward said predetermined position, said arm may cause said rod to move.

4. The improvement as set forth in claim 3 wherein said arm is arranged to move said rod in only one direction.

5. The improvement as set forth in claim 2 wherein said motion transfer means includes a cam surface mounted on said selector switch for rotational movement therewith, and a rod mounted for linear movement and having one end portion engaging said cam surface whereby, when said selector switch is rotated toward said predetermined position, said cam surface may cause said rod to move.

6. The improvement as set forth in claim 1 wherein said pressure responsive means includes a cylinder, and wherein said movable member is a piston slidably mounted in said cylinder, said piston separating a wet chamber of said cylinder from a dry chamber thereof, and wherein said terminals are operatively arranged in said dry chamber.

7. The improvement as set forth in claim 6 wherein said pressure responsive means further comprises catch means operatively arranged to prevent said piston from moving toward said terminals if the pressure of hydraulic fluid in said wet chamber drops below a predetermined minimum pressure.

8. The improvement as set forth in claim 7 wherein said catch means includes a plunger mounted on said cylinder and biased to normally engage the peripheral surface of said piston, and wherein said plunger is arranged to move into said dry chamber when said piston is moved to uncover said plunger.

9. The improvement as set forth in claim 1 wherein said pressure responsive means is mounted on said starter.

* * * * *